United States Patent [19]
Cho

[11] Patent Number: 5,953,004
[45] Date of Patent: Sep. 14, 1999

[54] DEVICE AND METHOD FOR CONTROLLING VIDEO MUTING USING A MICROCOMPUTER

[75] Inventor: Sung-Yun Cho, Kyungki-do, Rep. of Korea

[73] Assignee: SamSung Electronics Co., Ltd., Kyungki-do, Rep. of Korea

[21] Appl. No.: 08/785,973

[22] Filed: Jan. 22, 1997

[30] Foreign Application Priority Data

Jan. 22, 1996 [KR] Rep. of Korea ......................... 96-1278

[51] Int. Cl.$^6$ ....................................................... G06G 1/04
[52] U.S. Cl. .......................... 345/212; 315/384; 348/569
[58] Field of Search .................................. 345/211, 212; 348/378, 634, 565, 569; 315/384

[56] References Cited

U.S. PATENT DOCUMENTS

| | | |
|---|---|---|
| 4,918,531 | 4/1990 | Johnson .................................. 348/565 |
| 5,382,981 | 1/1995 | Inaba et al. . |
| 5,448,262 | 9/1995 | Lee et al. ................................. 345/212 |
| 5,463,289 | 10/1995 | Song . |
| 5,493,340 | 2/1996 | Kim . |

*Primary Examiner*—Steven J. Saras
*Assistant Examiner*—John G. Lim
*Attorney, Agent, or Firm*—Robert E. Bushnell, Esq.

[57] ABSTRACT

A video muting control device using a microcomputer, comprising a video mute key for generating a video mute command upon activation by a user; a microcomputer connected to the video mute key, the microcomputer generating a blanking control signal in response to an input of the video muting command, a preamplifier for receiving RGB video signals, the preamplifier generating an amplified video signal in response to a clamping signal and a contrast control signal, and a video mute circuit for muting a video display in response to the blanking control signal by grounding any one of the RGB video signals, the clamping signal and the contrast control signal.

12 Claims, 3 Drawing Sheets

DEVICE AND METHOD FOR CONTROLLING VIDEO MUTING USING A MICROCOMPUTER

CLAIM OF PRIORITY

This application makes reference to, incorporates the same herein, and claims all benefits accruing under 35 U.S.C § 119 from an application entitled *Device And Method For Controlling Video Mute Using Microcomputer* earlier filed in the Korean Industrial Property Office on the $22^{nd}$ day of January 1996, and there duly assigned Ser. No. 96-1278 by that Office.

BACKGROUND OF THE INVENTION

1. Field of the Invention

The present invention relates to color monitors and video display processes generally, and, particularly to, a video muting circuit which can prevent images, generated according to display data stored in a computer, from being displayed on the monitor for a predetermined period of time, so that data is prevented from being viewed by an unauthorized person should the user of the computer leave the computer unattended while the data is being transmitted to the display screen.

2. Discussion of Related Art

Generally, a computer stores data which can be provided to other computer using a communication system such as a local area network (LAN) or an internet service. The data stored in the computer can be viewed by printing the data on a print medium or by displaying the data on a screen of a computer monitor.

Generally, data to be displayed is provided to a video amplifier as either monochrome input signals or color (RGB) input signals and amplified to a predetermined voltage level and the inversely amplified to a voltage level suitable for driving a cathode ray tube (CRT). In some models, the amplifier stages provide brightness and contrast control functions besides the amplifying function. The contrast control function allows the user to control the gain of the video signal, and the sharpness of the images. In order to realize the video signal on the screen of the monitor, the output of an image output circuit should maintain the output voltage swing sufficient to drive a cathode of the CRT. The video amplifying output voltage via the second video amplifier is affected by the pospo type used in the cathode ray tube, transmissivity of the monitor screen glass, and brightness setup. In case of the color monitor, one contrast controller simultaneously varies the entire contrast levels of three electron guns. The brightness controller simultaneously varies all brightness levels of the three electron guns to thereby control the brightness of the screen. With such a circuit, a user could manually control the brightness and contrast to mute the video signal by preventing the display of data on the screen during his/her absence. I have noticed that when the user is away from the monitor, the data can be redisplayed on the monitor by an unauthorized person by their manually controlling brightness and contrast. In addition, I have found that power is wasted due to the unnecessary display of the data during the absence of the user.

Recent efforts in related arts such as U.S. Pat. No. 5,382,981 to Hitoshi Inaba, et al., entitled *Video Muting Apparatus* and U.S. Pat. No. 5,463,289 to Moon. J. Song entitled *First Grid Muting Circuit* mention muting operations involving contrast control for, respectively, preventing deterioration of a cathode electrode and raster distortion. Neither of these efforts however, provides microcomputer control for muting a video signal to prevent display of computer data during the absence of a user. Other efforts in the art such as those represented by U.S. Pat. No. 5,493,340 to Yae Y. Kim entitled *Circuit For Displaying Screen Control Status Of A Monitor* endeavored to provide a circuit for simply muting the RGB signals to enable on screen display status signals to be displayed instead the image represented by the RGB signals.

SUMMARY OF THE INVENTION

Accordingly, the present invention is directed to an improved video process and circuit.

It is an object of the present invention to a device and a process for controlling video muting using a microcomputer that substantially obviates one or more of the problems due to the limitations and disadvantages of the related art.

It is another object to provide a video muting circuit which can block off the images of the monitor on which the data stored in the computer are displayed for a predetermined period of time.

To achieve these and other advantages and in accordance with the purpose of the present invention, as embodied and broadly described, an apparatus and process for controls video muting using a microcomputer by starting a video muting state by inputting a video muting command through a key input part, setting the video muting state by storing a video muting time in a predetermined buffer memory according to a video muting control signal, reducing the setup value by reducing the fixed buffer value as the time passes, checking the remaining time to determine if the fixed time passes, and releasing the video muting operation according to a predetermined key input.

It is to be understood that both the foregoing general description and the following detailed description are exemplary and explanatory and are intended to provide further explanation of the invention as claimed.

BRIEF DESCRIPTION OF THE ATTACHED DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DETAILED DESCRIPTION OF PREFERRED EMBODIMENT

Figure 1:
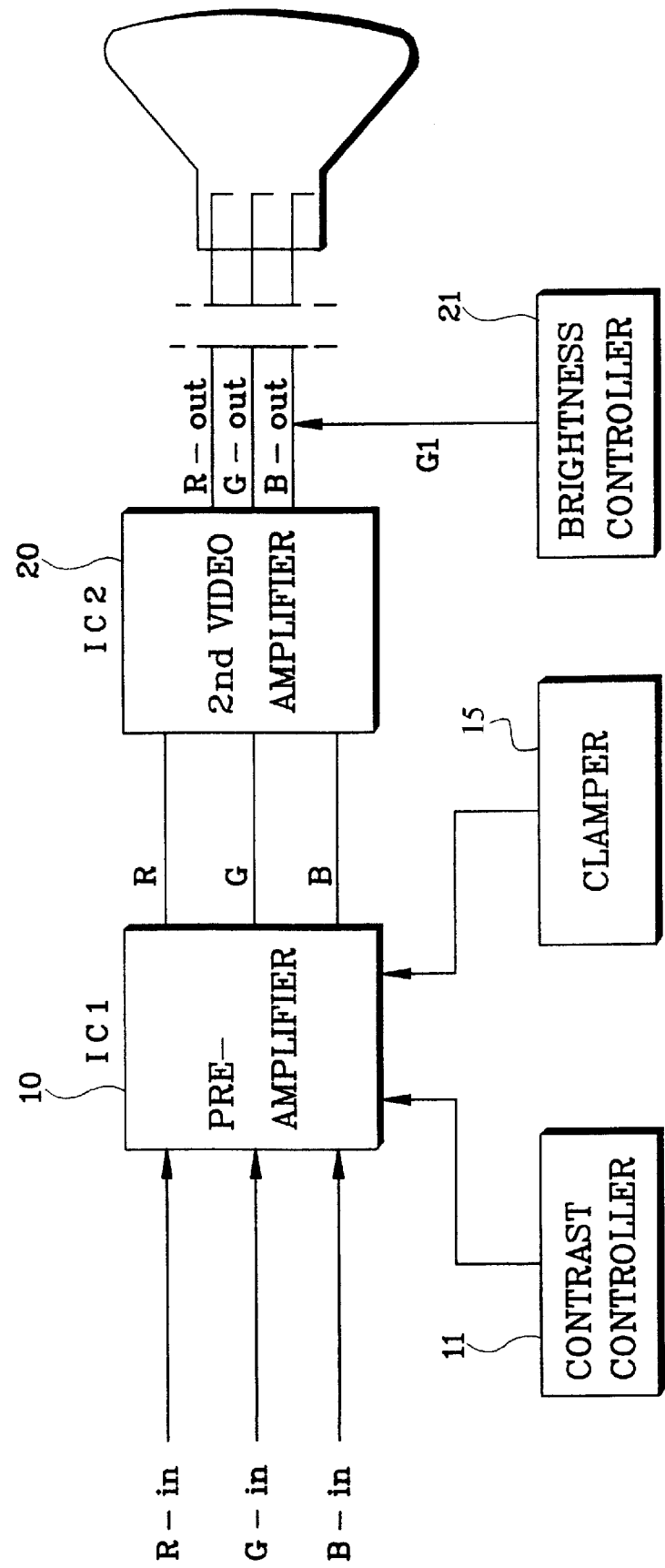
FIG. 1 is an exemplary block diagram of a monitor.

As illustrated in FIG. 1, a video amplifier 20 provides amplified video signals for display on a screen of a monitor by receiving the RGB input signals which are converted from the levels of 0.7 through 2.5 Vpp to the level of 4 through 6 Vpp by a preamplifier 10. A damper 15 establishes a fixed level for a picture signal at the beginning of each scanning line. Preamplifier 10 provides a contrast controlling function, in response contrast controller 11, and an initial amplifying function. The contrast controlling function controls the gain of the video signal, and the sharpness of the images. In order to realize the video signal on the screen of the monitor, an output voltage swing sufficient to drive a cathode of the cathode ray tube is maintained by video amplifier 20. The video amplifying output voltage via the second video amplifier is affected by brightness controller 21. For a color monitor, one contrast controller 11 simultaneously varies the entire contrast levels of three electron guns. Brightness controller 21 simultaneously varies all brightness levels of the three electron guns to thereby control the brightness of the screen. With such a circuit, a user should be able to simultaneously control the brightness and contrast of the display.

Figure 2:
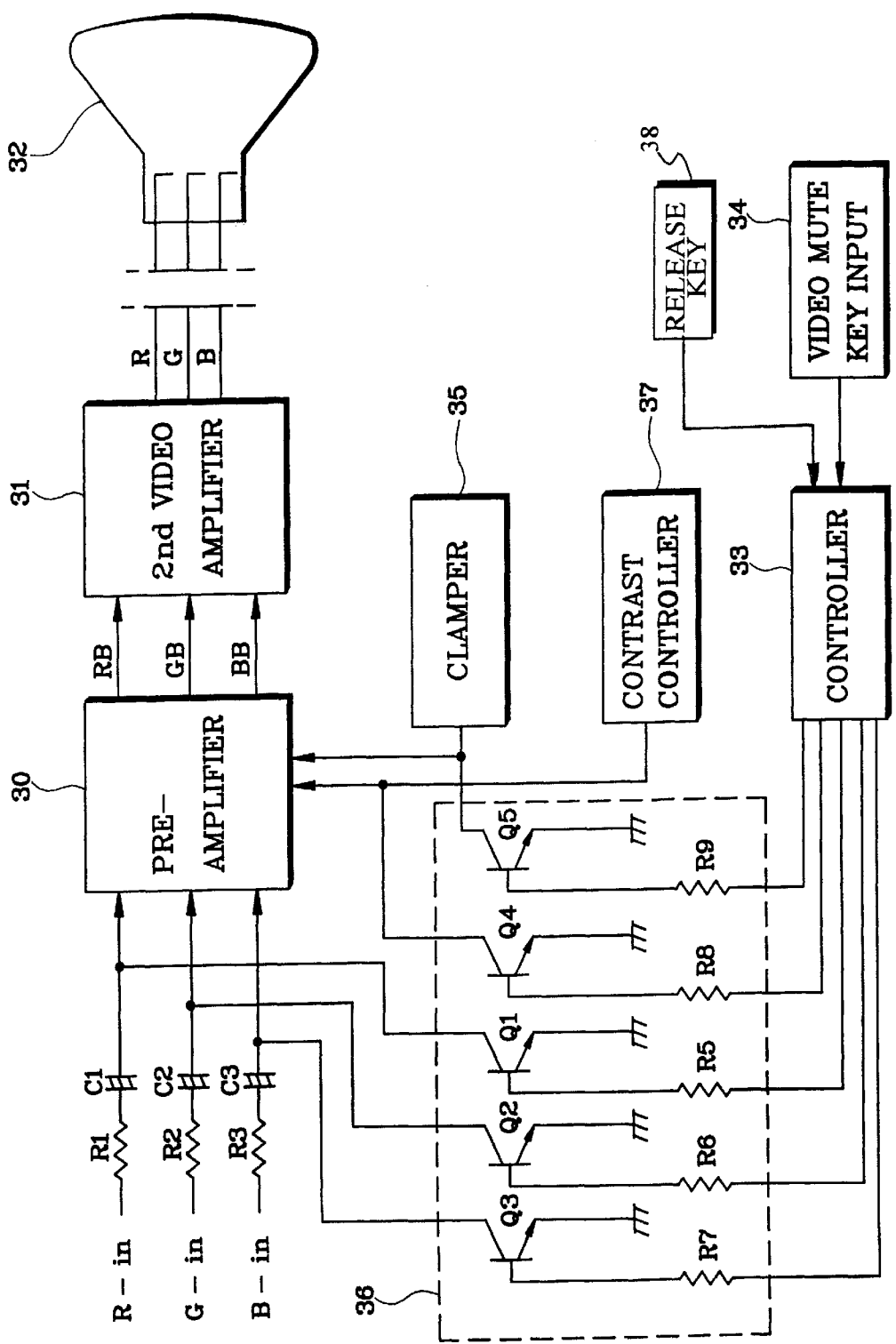
FIG. 2 is a circuit diagram of the video muting controlling device using a microcomputer according to the aspects of the present invention.
Figure 3:
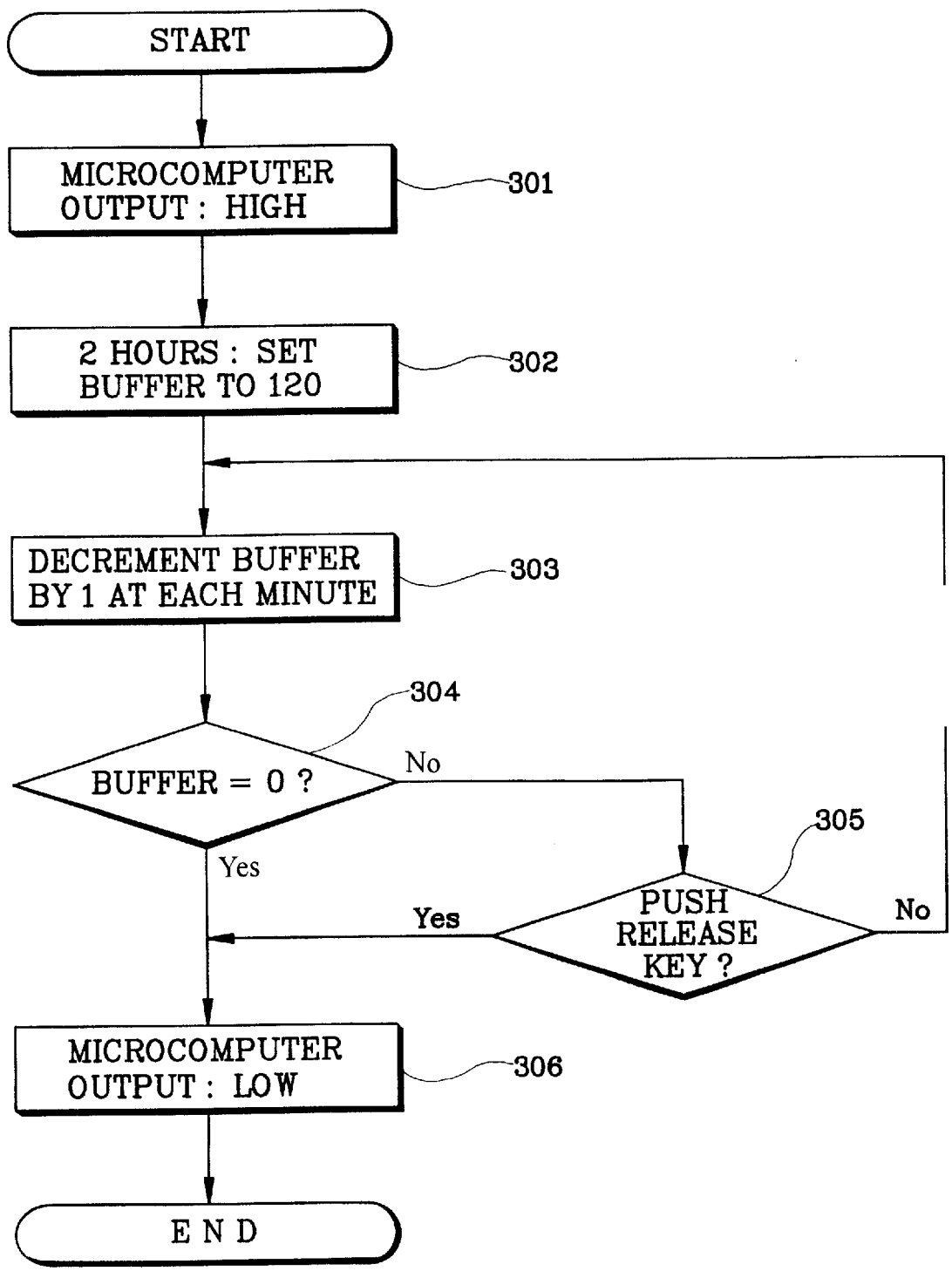
FIG. 3 is a flowchart illustrating the video muting controlling method using a microcomputer according to the aspects of the present invention.

In order to provide a controllable muting operation to the circuit of FIG. 1, a muting device as shown in FIG. 2 is provided according to the principles of the present invention. The circuit of FIG. 2 incorporates a preamplifier 30 for receiving the video signal and amplifying the signal with a stable voltage level, a second video amplifier 31 for receiving the amplified video signal from the preamplifier 30 and further amplifying it, a CRT 32 for displaying the data of the video signal output by amplifier 31, a damper 35 providing a clamping signal to preamplifier 30, a contrast controller 37 for outputting a contrast control signal to the preamplifier 30, an image muting circuit 36 for receiving a blanking control signal and for passing any one of the image signal, the contrast control signal and the clamp signal to a ground terminal, a controller 33 for outputting the blanking control signal to image muting circuit 36, and an image muting input control key 34 activated by a user to control controller 33 to output image muting control commands. A release key 38 is also provided and will be further described with respect to FIG. 3.

Image muting circuit 36 is made up with five transistors Q1 through Q5 and five resistors R5 and R9. The collector of transistor Q1 is connected to a first input terminal of preamplifier 30 to which red signal R is input. The collector of transistor Q2 is connected to a second input terminal of the preamplifier 30 to which a green signal G is input. The collector of transistor Q3 is connected to a third input terminal of the preamplifier 30 to which a blue signal B is input. The collector of transistor Q4 is connected to a fourth input terminal of the preamplifier 30 to which the contrast control signal is input. The collector of transistor Q5 is connected to a fifth input terminal of the preamplifier 30 to which the clamping signal is input. The blanking control signal output from controller 33 is input to the base terminal of each transistor Q1 through Q5 through respective resistors R5 through R9.

Accordingly, any one of the R, G, B video signals, contrast control signal, and clamping signal can be stopped from being input to the preamplifier 30 by controlling transistors Q1–Q5 to provide any one or more of the video signals, contrast control signal and clamping signal to the ground terminal, thereby preventing an images from being displayed on monitor 32.

An operation and effects of the invention are described as follows. In a first muting method, the R, G, and B (hereafter; RGB) video signals are respectively input through the resistors R1 through R3 and corresponding capacitors C1 through C3 to the preamplifier 30 from an image processing part (not shown). To prevent the RGB video signals from being input to preamplifier 30, a user inputs a video muting command by activating video muting key 34. Controller 33 than outputs a blanking control signal to transistors Q1 through Q3 to thereby switch them on. When transistors Q1 through Q3 are switched on, their respective collector terminals are conductive through their emitter terminals, so that they are grounded. Therefore, the video signal input terminals of preamplifier 30 connected to the collector terminals of each transistor Q1 through Q3 are grounded, so that the RGB video signals input thereto are passed to the ground terminal and thus cannot be input to preamplifier 30. As a result, since preamplifier 30 can not output a video signal, the images are not shown on the screen of CRT 32.

In a second muting method, the contrast control signal input to the preamplifier 30 may be cut off by a user inputting the video muting command by activating video muting key 34. The contrast control signal is the direct current voltage signal, and thus decides the power voltage Vcc of the differential amplifier in the preamplifier to thereby decide the operational point of the video signal gain. When the user inputs the video muting command through the video muting key 34, controller 33 outputs the blanking control signal to the base of transistor Q4 to thereby switch on transistor Q4. When transistor Q4 is switched on, its collector terminal is conductive through its emitter terminal, so that it is grounded so that the contrast control signal input thereto is passed to the ground terminal. Accordingly, contrast control signal of 0V is input to preamplifier 30, and preamplifier 30 can not output a video signal and the image is prevented from being displayed on the screen of CRT 32.

In a third muting method, damper 35 receives a vertical synchronization signal (not shown), and the clamping signal is thus synchronized with the video signal, and makes the amplification of the RGB video signal by preamplifier 30 possible. Therefore, if the clamping signal is not input to preamplifier 30, the preamplifier can not output the RGB video signals. When the user inputs the video muting command through the video muting key 34, controller 33 may output the blanking control signal to the base of transistor Q5 to switch transistor Q5 on. When transistor Q5 is switched on, its collector terminal is conductive through the emitter terminal, and it is grounded. Therefore, the clamping signal input terminal of preamplifier 30 connected to the collector terminal of transistor Q5 is grounded, so that the clamping signal input thereto is passed to the ground terminal. Accordingly the clamping signal is input as 0V to preamplifier 30 and the video signal can not be output and the image is prevented from being displayed on the screen of CRT 32.

Accordingly, the screen of the monitor is muted as described above when a user desires to mute the video display. Additionally, a muting time is also controlled according to a further aspect of the invention as will be described with respect to FIG. 3. In step 301 the microcomputer of controller 33 outputs a HIGH control signal as the blanking control signal to turn on any of transistors Q1–Q5 when controller 33 receives the video muting command according to activation of video mute key 36 by the user. Here the CRT 32 screen is muted any one of the three methods discussed above. In step 302, the muting time is set and input to a time set buffer. As an example, the muting time is assumed to be two hours, thus the time is stored in minute units so that the time data is set to 120 minutes. The time set buffer is then decremented by 1 every passing minute in step 303. In step 304 the microcomputer determines whether the value of the time set buffer is equal to 0. When it is determined that the time set buffer does not equal 0, the microcomputer checks, in step 305, for user activation of release key 38, which can a be a previously designated one or more of the keys on the keyboard of the computer and may even be in the form of a code or password. When it is determined in step 305 that the release key is not input, the process returns to step 303. When it is determined that the time set buffer is equal to 0 in step 304, or that the release key is input in step 305, the microcomputer outputs a "low" level logic signal as the blanking control signal output from controller 33 in step 306. Accordingly, the transistors Q1–Q5 of video muting circuit 36 which were turned on by the activation of video mute key 34 are turned off in step 306 and the data can again be displayed on the screen of monitor 32.

As described above, the invention enables the monitor to perform the video muting state in case a computer user leaves the work station, thereby preventing the power of the monitor from being wasted and preventing data from being leaked to unauthorized personnel.

It will be apparent to those skilled in the art that various modifications and variations can be made in the device and method for controlling a video muting using a microcomputer of the present invention without departing from the spirit or scope of the invention. Thus, it is intended that the present invention cover the modifications and variations of this invention provided they come within the scope of the appended claims and their equivalents.

What is claimed is:

1. A method for controlling a video muting using a microcomputer, comprising the steps of:

starting a video muting state of muting a video display by inputting a video muting command through user activation of a video mute key, said step of starting a video muting state comprising steps of:
generating a blanking control signal having a high logic value when said user activates said video mute key; and
providing said blanking control signal to a video mute circuit for grounding any of a clamping signal, RGB video signals and a contrast control signal input to a preamplifier of said video display, said step of providing said blanking control signal to a video mute circuit comprising a step of turning on a first transistor by providing said blanking control signal to a base of said first transistor for passing said clamping signal to a sound terminal via a collector and emitter of said first transistor;

controlling a time length of said video muting state by storing a video muting time in a buffer memory in response to said video muting command;

periodically decrementing said video muting time by a predetermined time value;

determining whether said video muting time has elapsed;

determining whether a release command is input by user activation of a release key when it is determined that said video muting time has not elapsed; and stopping said video muting state when it is determined that said video muting time has elapsed or when it is determined that said release command is input.

2. The method as set forth in claim 1, said step of providing said blanking control signal to a video mute circuit also comprising a step of simultaneously turning on a second, third and fourth transistor by providing said blanking control signal to a base of each of said second, third and fourth transistors for passing a respective first, second and third component of said RGB video signals to said ground terminal via a respective collector and emitter of said second, third and fourth transistors.

3. The method as set forth in claim 1, said step of providing said blanking control signal to a video mute circuit also comprising a step of turning on a second transistor by providing said blanking control signal to a base of said second transistor for passing said contrast control signal to said ground terminal via a collector and emitter of said second transistor.

4. A video muting control device using a microcomputer, comprising:

a video mute key for generating a video mute command upon activation by a user;

a microcomputer connected to said video mute key, said microcomputer generating a blanking control signal in response to an input of said video muting command;

a preamplifier for receiving RGB video signals, said preamplifier generating an amplified video signal in response to a clamping signal and a contrast control signal; and a video mute circuit for muting a video display in response to said blanking control signal by grounding any of said clamping signal, said RGB video signals and said contrast control signal.

5. The video muting control device as set forth in claim 4, further comprising a release key for generating a release control signal, said microcomputer being responsive to said release control signal for controlling said video mute circuit to stop muting said video display.

6. The video muting control device as set forth in claim 4, wherein said mute circuit comprises:

a first transistor having a base connected to receive said blanking control signal from said microcomputer, a collector connected to a first video input of said preamplifier and an emitter connected to a ground terminal, said first input terminal receiving a red one of said RGB video signals;

a second transistor having a base connected to receive said blanking control signal from said microcomputer, a collector connected to a second video input of said preamplifier and an emitter connected to a ground terminal, said second input terminal receiving a green one of said RGB video signals;

a third transistor having a base connected to receive said blanking control signal from said microcomputer, a collector connected to a third video input of said preamplifier and an emitter connected to a ground terminal, said third input terminal receiving a blue one of said RGB video signals;

a fourth transistor having a base connected to receive said blanking control signal from said microcomputer, a collector connected to a contrast input of said preamplifier and an emitter connected to a ground terminal; and a fifth transistor having a base connected to receive said blanking control signal from said microcomputer, a collector connected to a clamping input of said preamplifier and an emitter connected to a ground terminal.

7. A video muting control device using a microcomputer, comprising:

a video mute key for generating a video mute command upon activation by a user;

a microcomputer connected to said video mute key, said microcomputer generating a blanking control signal in response to an input of said video muting command;

a preamplifier for receiving RGB video signals, said preamplifier generating an amplified video signal in response to a clamping signal and a contrast control signal;

a video mute circuit for muting a video display in response to said blanking control signal by grounding any of said clamping signal, said RGB video signals and said contrast control signal;

said microcomputer having time set buffer for storing a video muting time value limiting the length of time of generation of said blanking control signal;

said microcomputer periodically decrementing said video muting time value by a predetermined time value;

said microcomputer determining whether said video muting time value has been decremented to a value of zero;

said microcomputer determining whether a release command is input by user activation of a release key when it is determined that said video muting time value has not been decremented to said value of zero;

stopping said video muting state when it is determined that said video muting time value has been decremented to a value of zero or when it is determined that said release command is input.

8. The video muting control device as set forth in claim 7, wherein said mute circuit comprises:

a first transistor having a base connected to receive said blanking control signal from said microcomputer, a collector connected to a first video input of said preamplifier and an emitter connected to a ground terminal, said first input terminal receiving a red one of said RGB video signals;

a second transistor having a base connected to receive said blanking control signal from said microcomputer, a collector connected to a second video input of said preamplifier and an emitter connected to a ground terminal, said second input terminal receiving a green one of said RGB video signals; and a third transistor having a base connected to receive said blanking control signal from said microcomputer, a collector connected to a third video input of said preamplifier and an emitter connected to a ground terminal, said third input terminal receiving a blue one of said RGB video signals.

9. The video muting control device as set forth in claim 8, wherein said mute circuit comprises:

a fourth transistor having a base connected to receive said blanking control signal from said microcomputer, a collector connected to a contrast input of said preamplifier and an emitter connected to a ground terminal.

10. The video muting control device as set forth in claim 9, wherein said mute circuit comprises:

a fifth transistor having a base connected to receive said blanking control signal from said microcomputer, a collector connected to a clamping input of said preamplifier and an emitter connected to a ground terminal.

11. The video muting control device as set forth in claim 7, wherein said mute circuit comprises:

a transistor having a base connected to receive said blanking control signal from said microcomputer, a collector connected to a contrast input of said preamplifier and an emitter connected to a ground terminal.

12. The video muting control device as set forth in claim 7, wherein said mute circuit comprises:

a transistor having a base connected to receive said blanking control signal from said microcomputer, a collector connected to a clamping input of said preamplifier and an emitter connected to a ground terminal.

* * * * *